United States Patent
Fang et al.

(10) Patent No.: US 7,126,954 B2
(45) Date of Patent: Oct. 24, 2006

(54) VIRTUAL GATEWAY

(75) Inventors: Zheng Fang, Horsham, PA (US);
Christian Carpico, Schwenksville, PA (US)

(73) Assignee: General Instrument Corporation, Horsham, PA (US)

( * ) Notice: Subject to any disclaimer, the term of this patent is extended or adjusted under 35 U.S.C. 154(b) by 1063 days.

(21) Appl. No.: 10/054,230

(22) Filed: Nov. 13, 2001

(65) Prior Publication Data

US 2003/0091046 A1    May 15, 2003

(51) Int. Cl.
*H04L 12/28* (2006.01)
(52) U.S. Cl. .................. 370/401; 370/269; 370/392
(58) Field of Classification Search ........... 370/401, 370/392, 260
See application file for complete search history.

(56) References Cited

U.S. PATENT DOCUMENTS

| | | | | |
|---|---|---|---|---|
| 5,845,267 A | * | 12/1998 | Ronen | 705/40 |
| 6,154,839 A | | 11/2000 | Arrow et al. | 713/154 |
| 6,272,127 B1 | | 8/2001 | Golden et al. | 370/352 |
| 6,671,262 B1 | * | 12/2003 | Kung et al. | 370/260 |
| 6,751,677 B1 | * | 6/2004 | Ilnicki et al. | 719/316 |
| 6,938,171 B1 | * | 8/2005 | Isomichi et al. | 713/153 |
| 2002/0095599 A1 | * | 7/2002 | Hong et al. | 713/201 |
| 2004/0252683 A1 | * | 12/2004 | Kennedy et al. | 370/389 |

* cited by examiner

*Primary Examiner*—Doris H. To
*Assistant Examiner*—Steven Blount
(74) *Attorney, Agent, or Firm*—Benjamin D. Driscoll

(57) ABSTRACT

A virtual gateway bridges voice and related signaling traffic between multiple endpoints behind the same or different Network Address Translation devices or firewalls or neither. The virtual gateway also serves as a mixer when used in a teleconferencing mode, which handles a number of endpoints that are behind the same Network Address Translation device or firewall or not. In this mode, the virtual gateway mixes packets on its incoming side with other packets on its incoming side so that all outgoing packets include voice (or other) data from all sources. The embodiments herein may be used with Voice over IP (VoIP) connections and applications, as well as other applications in which two or more endpoints are attempting to establish a communications channel and their IP addresses are otherwise not suitable for the communications application.

22 Claims, 4 Drawing Sheets

VIRTUAL GATEWAY

FIELD OF THE INVENTION

The present invention relates generally to methods and apparatus for transmitting data over a communications network, and more particularly to a method and apparatus for transmitting voice and other data over a communications network operating with packet-switched protocols, such as Internet Protocols.

BACKGROUND

When setting up a two-way voice conversation over an Internet Protocol (IP)-based communications network between two user devices, a third device will typically coordinate the activity. An example of such a coordinating device includes a Call Coordinator, which creates a communications link between two IP addresses to facilitate the voice traffic handling.

When the two user devices are behind the same Network Address Translation (NAT) device with different public mapped IP Addresses, it is possible that the call coordinating device cannot determine that the two user devices are behind the same NAT device. Therefore, the coordinating device cannot continue the call setup.

Moreover, when two devices are behind the same Firewall, they cannot communicate using their mapped public IP Addresses. In general, a Firewall will drop any outgoing packets that are destined for an IP address inside the network due to standard security policies. These security policies prevent traffic from going outside the network if their destination lies inside the network. This type of connection, however, is precisely what the Call Coordinator or other coordinating device is attempting to set up when establishing the two-way voice call under such circumstances.

Furthermore, this problem may be more prevalent than it appears on the surface. For example, a single entity may serve as a firewall for more than one network, thereby preventing users of the same firewall from being able to establish voice-over-IP connections. In some cases, the users may not even be aware that they are behind the same firewall or NAT.

In addition, two devices behind the same NAT may belong to different private networks using the same private network IDs, and will therefore be unable to communicate via their private addresses.

The present invention is therefore directed to the problem of developing a method and apparatus for establishing communication paths between any two or more endpoints on an IP-based communications network, whether or not these two or more endpoints are behind the same or different NAT devices or firewalls.

SUMMARY OF THE INVENTION

The present invention solves these and other problems by providing a virtual gateway that bridges voice and related signaling traffic between multiple endpoints behind the same or different Network Address Translation devices or firewalls.

According to one exemplary embodiment of the present invention, the virtual gateway also serves as a mixer when used in a teleconferencing mode, which handles a number of endpoints that are behind the same Network Address Translation device or firewall or not. In this mode, the virtual gateway mixes packets on its incoming side with other packets on its incoming side so that all outgoing packets include voice (or other) data from all other sources.

While the embodiments herein are described for use with Voice over IP (VoIP) connections and applications, other applications may be possible when two or more endpoints are attempting to establish a communications channel and their IP addresses are otherwise not suitable for the communications application.

Moreover, while the embodiments solve the problem due to two endpoints being behind the same or different NAT devices or firewalls, employing these embodiments in all situations, even when for example, the two or more endpoints are not behind a firewall or NAT device, prevents problems from arising due to lack of information as to where the endpoints are located. Furthermore, the embodiments remove this information requirement, thereby permitting a more generalized implementation.

DETAILED DESCRIPTION

Figure 1:
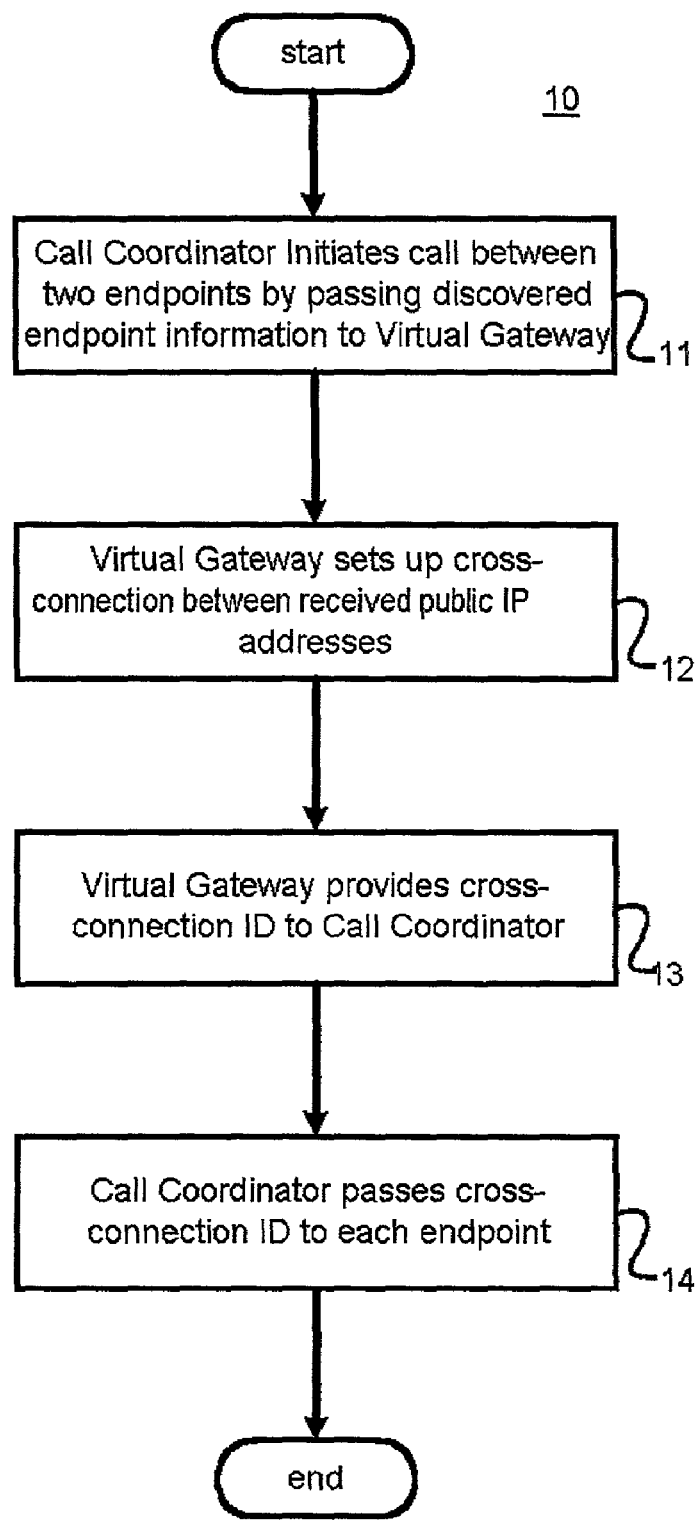
FIG. 1 depicts an exemplary embodiment of a method for performing a two-way voice telephone call over an IP-based communications network according to one aspect of the present invention.

It is worthy to note that any reference herein to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

The present invention provides a method and apparatus for establishing a communications channel between two endpoints that may be located behind the same or different Network Address Translation (NAT) devices or firewalls or neither. One possible implementation of an apparatus for establishing this communications channel is a termed herein a virtual gateway.

In general, the Virtual Gateway acts as a proxy for the device attempting to set up the communications channel using Internet Protocol (IP) addresses that are suitable for the communications channel, and establishing a cross-connection between the two endpoints of the communications channel to be established. When the device creating the communications channel receives a request from one endpoint to establish the channel, the communications channel-creating device (e.g., a Packet Cable Call Agent) may contact the Virtual Gateway and provide the endpoint information (e.g., the endpoint IP addresses and service ports). The Virtual Gateway then provides an IP address and a port for each of the endpoints and establishes a cross-connection between this IP address and port so that incoming packets from a source endpoint are automatically forwarded to a destination endpoint, and vice versus.

The Virtual Gateway may provide a unique IP address and port to each endpoint. Alternatively, the Virtual Gateway may provide a single IP address and port to all endpoints, in which case the Virtual Gateway will use the incoming packet source ID to determine for which endpoint the packet is destined.

In the case of more than two endpoints, the Virtual Gateway will also perform a mixing function on received voice packets. For example, in the case of three endpoints, voice packets received from endpoints one and two will be mixed together and sent to endpoint three; similarly, voice packets received from endpoints one and three will be mixed together and sent to endpoint two; and, voice packets received from endpoints two and three will be mixed together and sent to endpoint one. A similar mixing process occurs for more than three endpoints.

Thus, using the virtual gateway one can establish a path for multiple endpoints to allow call signaling and voice traffic. Other applications are also possible, in which one desires to establish a communications channel between two or more endpoints that may or may not be behind the same or different NAT devices or firewalls. Moreover, while the embodiments herein are discussed with regard to voice packets, the embodiments herein are also applicable to any applications that involve creating a channel between multiple endpoints in which the packets being transmitted include non-voice data, but require similar connections and performance as voice packets.

Referring to FIG. 1, shown therein is an exemplary embodiment of a process 10 according to one aspect of the present invention for establishing a two-way telephone call over an IP-based communications network. In a two-way call mode, the Call Coordinator (for example, a Packet Cable NCS Call Agent or other similar device) passes discovered endpoint information, including the public IP addresses to the Virtual Gateway (step 11). The Virtual Gateway sets up an internal cross-connection between those two public IP addresses (step 12). The Virtual Gateway will then provide a cross-connection ID, consisting of its own public IP address and a particular service port, back to the Call Coordinator (step 13). As stated above, this public IP address and service port may be unique to each endpoint or the same. In the latter case, the Virtual Gateway uses the incoming packet source ID to determine the proper outgoing port. The Call Coordinator will then pass the cross-connection ID to each endpoint (step 14). The endpoints will then use this cross-connection ID to complete any further call signaling and voice traffic destined for another endpoint.

Figure 2:
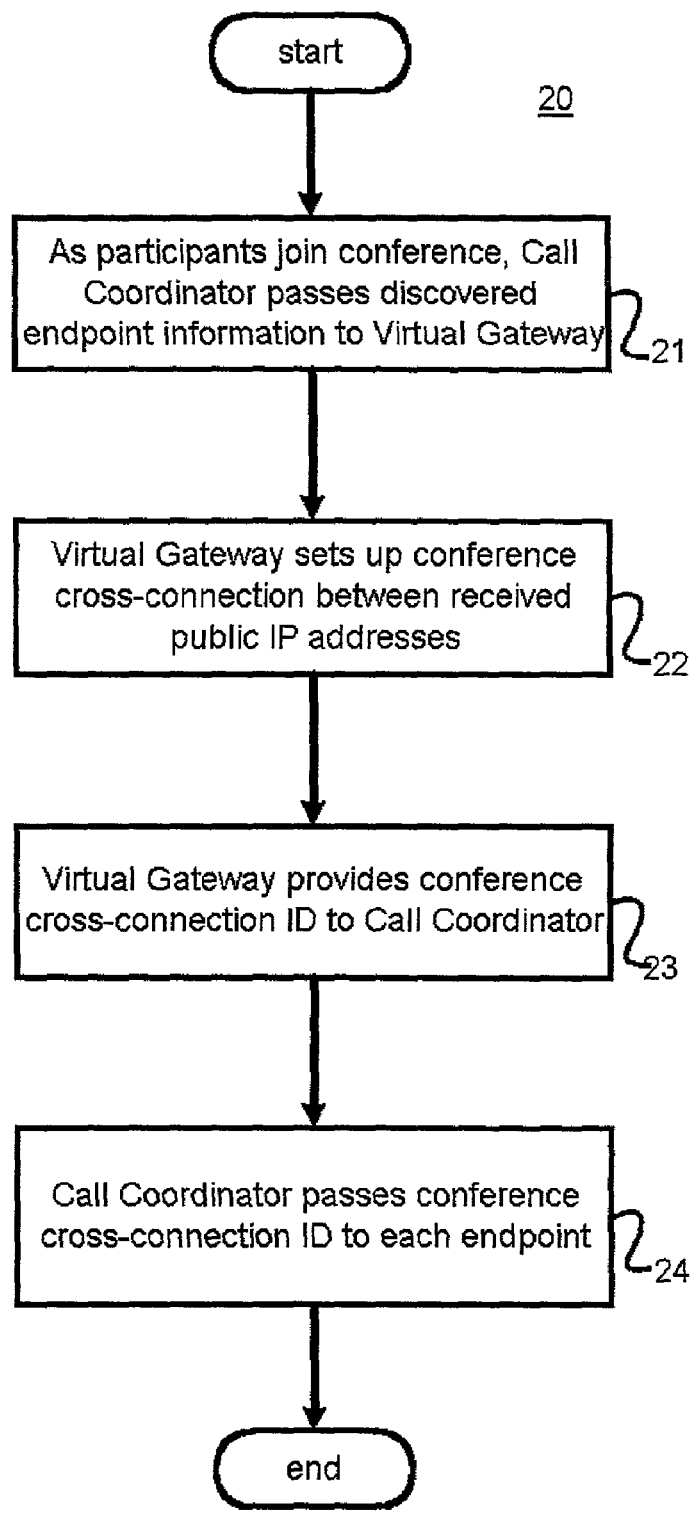
FIG. 2 depicts an exemplary embodiment of a method for performing a teleconference call over an IP-based communications network according to another aspect of the present invention.

Referring to FIG. 2, shown therein is an exemplary embodiment of a process 20 according to another aspect of the present invention for establishing a multi-party call, such as a conference call over an IP-based communications network. In a multi-party conference mode, the Call Coordinator collects information from multiple endpoints when they join the conference. As participants join the conference, endpoint information is passed on to the virtual gateway (step 21), which is providing mixer functionality. The Virtual Gateway sets up a cross-connection between those public IP addresses (step 22). Similar to the two-way call, the virtual gateway will provide a conference cross-connection ID to the Call Coordinator (step 23). As stated above, this public IP address and service port may be unique to each endpoint or the same. In the latter case, the Virtual Gateway uses the incoming packet source ID to determine the proper outgoing ports. The conference cross-connect ID will then be sent to each participating endpoint (step 24). The endpoints will then use this conference cross-connection ID to complete any further call signaling and voice traffic destined for another endpoint.

All other Class 5 features, such as Call Waiting, Call Forwarding, etc. can be accomplished using similar interactions among the Call Coordinator, Virtual Gateway and Endpoints. The Virtual Gateway concept not only facilitates call setup by the Call Coordinator, but also provides a generic mechanism for packet cable inter-domain call setup.

Figure 3:
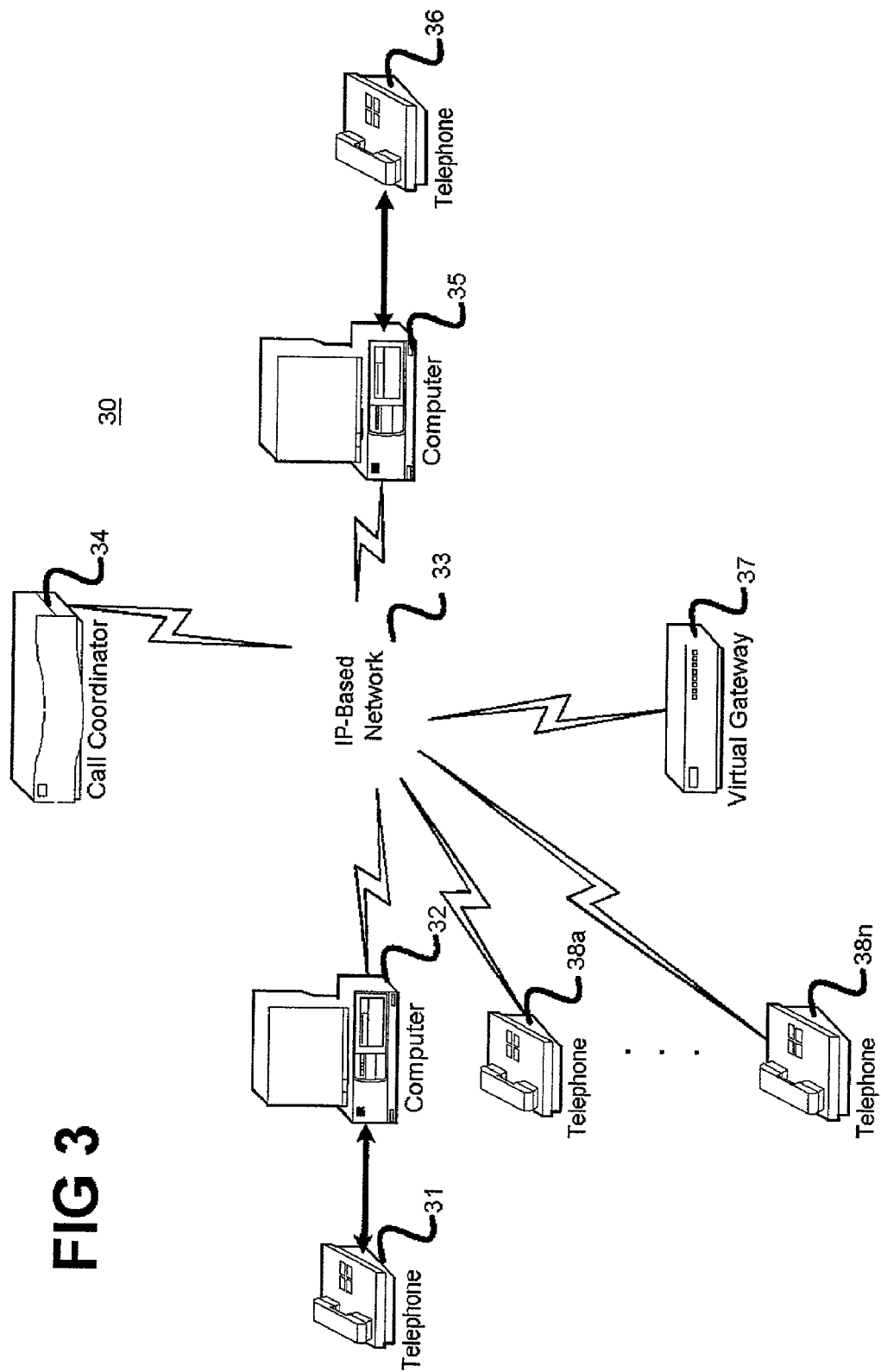
FIG. 3 depicts an exemplary embodiment of a system for performing Voice-over-IP connections according to yet another aspect of the present invention.

Referring to FIG. 3, shown therein is an exemplary embodiment 30 of a system according to another aspect of the present invention for implementing the above methods. A standard (analog or digital) telephone 31 is coupled to the Internet (or other IP-based communications network) 33 via a personal computer 32 or the like. The PC 32 may be simply a processor or other device that interfaces the telephone to the Internet, such as a voice enabled cable modem. Another standard telephone 36 is similarly coupled to the Internet 33 via another computer 35 or the like. Additional telephones 38a–38n may be coupled to the Internet either directly or via another computer (not shown). Virtual Gateway 37 and Call Coordinator 34 are also coupled to the Internet. Call Coordinator 34 consists of a software program that executes on a server that is coupled to the Internet 33. Examples of known Call Coordinators include: Packet Cable Call Agent, Net2phone Call Controller, etc.

One possible embodiment of the Virtual Gateway 37 is a software program that executes on a server that is coupled to the Internet. The server on which the Call Coordinator executes may be the same as the server on which the Virtual Gateway executes, or the two servers may be different and not even geographically close.

Figure 4:
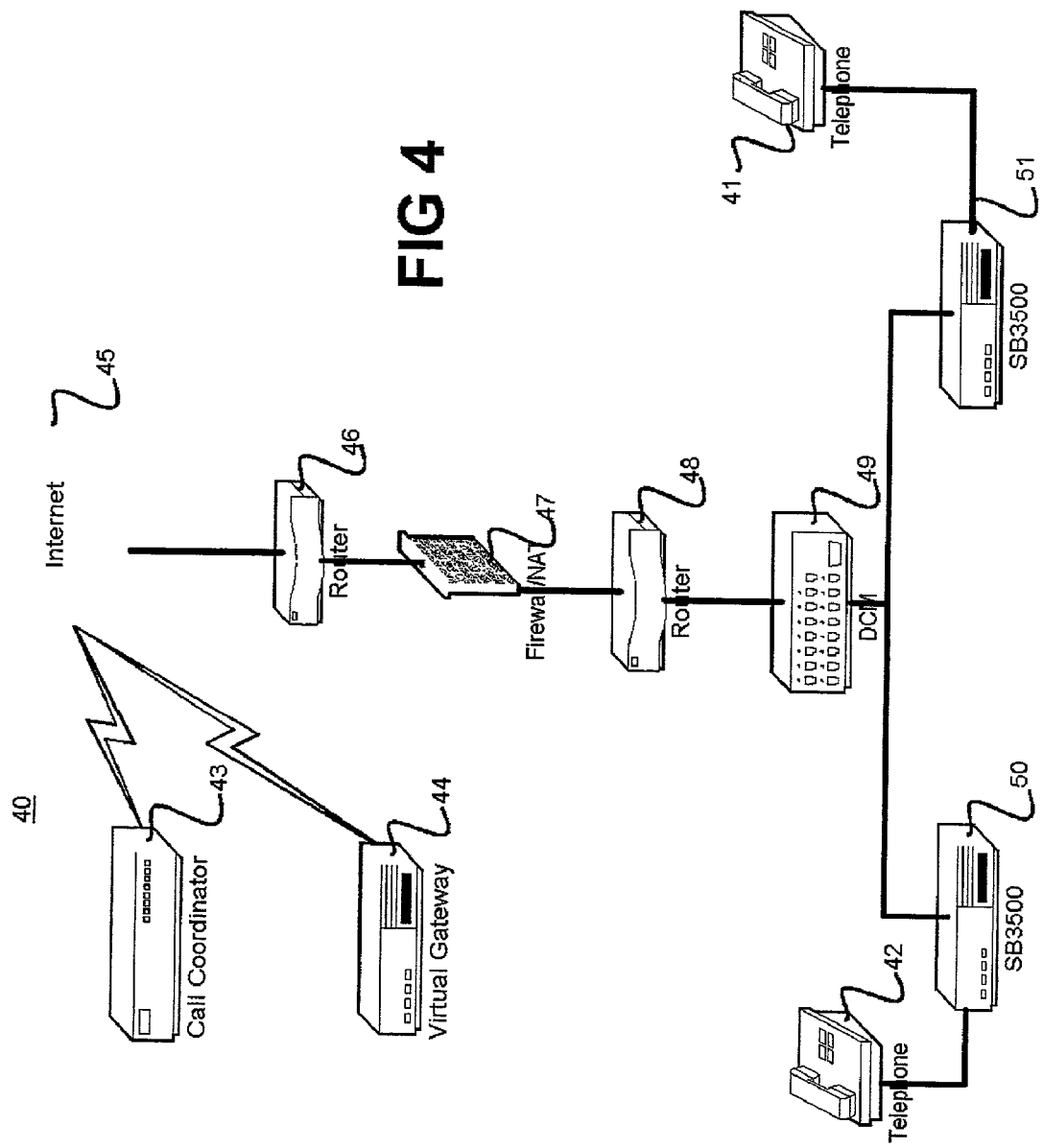
FIG. 4 depicts an exemplary embodiment of another apparatus for performing Voice-over-IP connections according to yet another aspect of the present invention.

One example of virtual gateway usage is depicted in FIG. 4, which depicts an exemplary system 40 according to another aspect of the present invention. Two voice enabled cable modems (e.g., SB3500 devices, a Motorola Multimedia Terminal Adapter (MTA) product) 50, 51 are coupled to router 48 via DCM 49, a Motorola Cable Modem Termination System product. In turn, router 48 is coupled to router 46, which is outside firewall/NAT 47 and which is coupled to the Internet 45. Telephones 41, 42 are coupled to the two SB3500 devices.

In this system 40, the two SB3500 devices 50, 51 are located behind the same NAT/firewall 47. SB3500 device 50 has an internal IP address of 10.10.17.134 and a public IP address of 207.103.20.204. SB3500 device 51 has an internal IP address of 10.10.17.135 and a public IP address of 207.103.20.205.

When setting up the call, the Call Coordinator 43 passes the public IP addresses to the Virtual Gateway 44, whose IP address, for example is 168.84.33.4. The Virtual Gateway then creates a cross-connection internally that automatically couples incoming packets from IP address and port 207.103.20.204:29152 to 207.103.20.205:29152, which is the IP address and port for the other device 51. Similarly, the Virtual Gateway creates a cross-connection internally that couples incoming packets from IP address and port 207.103.20.205:29152 to IP address and port 207.103.20.204:29152, which is the IP address and port for the first device 50. The Virtual Gateway then sends an IP address and port (e.g., 168.84.33.4:5900) back to the Call Coordinator 43, which is then forwarded to the respective devices 50, 51. Packets from the two devices are then sent to the IP address and port specified by the Virtual Gateway 44. Thus, incoming packets from one device 50 are automatically routed through the Virtual Gateway and out to the other device 51 and vice versus.

When setting up a multi-party conference call, the Call Coordinator 43 passes the public IP addresses and ports to the Virtual Gateway 44. The Virtual Gateway then creates a cross-connection internally that automatically couples incoming packets from one IP address and port to all other IP addresses and ports specified by the Call Coordinator 43. To do so, the Virtual Gateway performs a mixing function on voice packets, which takes the voice from all sources but one and creates a new packet of composite voice which is then forwarded to the one unit who's voice was excluded. This process is repeated for each source.

For example, we assume Call Coordinator is attempting to set up a conference call between three IP addresses and ports: (1) 207.103.20.204:29152; (2) 207.103.20.205:29152; and (3) 207.105.20.95:39447. In the mixing function, voice packets from (1) and (3) are combined and sent to (2). Similarly, voice packets from (1) and (2) are combined and sent to (3). Also, voice packets from (2) and (3) are combined and sent to (1). This mixing process occurs on a continual basis during the connection.

As before, the Virtual Gateway sets up a cross-connection between these incoming IP addresses and ports and sends out an IP address and port for the devices to use to send data to. For example, the Virtual Gateway sends 168.84.33.4:58998 back to the Call Coordinator 43, which then forwards this IP address and port to the three devices for which the call is being set up. Thus packets from each device are automatically routed through the Virtual Gateway to the other devices participating in the conference call.

The embodiments disclosed herein enable low-cost telephone calls to be made over the Internet or other computer networks. These embodiments make possible low-cost Voice over IP communications. Other applications include non-voice specific applications, such as teleconferencing, white board applications, and any application that requires third party server coordination.

The embodiments of methods or apparatuses discussed herein have been with reference to two endpoints that are behind the same NAT or firewall. However, these same methods and embodiments are applicable and should be used when there is no other suitable communications channel. For example, the embodiments would be applicable when both parties are behind the same or different NAT devices or firewalls. Moreover, the embodiments would be applicable when both endpoints are behind the same NAT. Unfortunately the NAT configuration may prevent the Call Coordinator from learning this, as it may assign different public IP addresses. Therefore, the embodiments may be applicable when there is any question as to whether the two endpoints are behind the same or different NAT. Furthermore, the embodiments may be applicable in all cases to prevent problems from arising on a user-dependent basis. In a conference mode, the embodiments are applicable if any two (or more) devices are behind the same or different NAT, even if some other devices may not be behind the same or different NAT.

Although various embodiments are specifically illustrated and described herein, it will be appreciated that modifications and variations of the invention are covered by the above teachings and are within the purview of the appended claims without departing from the spirit and intended scope of the invention. Furthermore, these examples should not be interpreted to limit the modifications and variations of the invention covered by the claims but are merely illustrative of possible variations.

What is claimed is:

1. A method for establishing a communications channel over an IP-based network comprising:
   receiving first endpoint information from a first endpoint regarding a desired communications channel to be established between the first endpoint and a second endpoint, wherein said first endpoint information includes at least a first public IP address associated with the first endpoint;
   receiving second endpoint information from a second endpoint wherein the second endpoint information includes at least a second public IP address associated with the second endpoint;
   creating a cross-connection between the at least two public IP addresses; and
   providing a first cross-connection ID to the first endpoint wherein the first cross-connection ID comprises a third public IP address not associated with either the first endpoint or the second endpoint.

2. The method according to claim 1, wherein the first cross-connection ID further includes a port ID.

3. The method according to claim 2, further comprising:
   providing the first cross-connection ID to the second endpoint.

4. The method according to claim 2, further comprising:
   providing a second cross-connection ID to the second endpoint wherein the second cross-connection ID comprises a fourth public IP address not associated with either the first endpoint or the second endpoint and different from the third IP address.

5. The method according to claim 1, wherein the first endpoint information and second endpoint information are received from an intermediate device attempting to establish the communications channel between the at least two endpoints.

6. The method according to claim 2, further comprising receiving one or more packets from the first endpoint at the third IP address and port specified in the first cross-connection ID.

7. The method according to claim 4, further comprising forwarding a first set of one or more packets from the first endpoint received at the third IP address and a first port to an outgoing port associated with the second endpoint.

8. The method according to claim 7, further comprising forwarding the first set of one or more packets from the first endpoint to the second endpoint.

9. The method according to claim 8, further comprising receiving a second set of one or more packets from the second endpoint at the fourth IP address and a second port specified in the second cross-connection ID.

10. The method according to claim 9, further comprising forwarding the second set of one or more packets from the second endpoint received at the fourth IP address and the second port to an outgoing port associated with the first endpoint.

11. The method according to claim 10, further comprising forwarding the second set of one or more packets from the second endpoint to the first endpoint.

12. A method for establishing a communications channel over an IP-based network between at least three endpoints comprising:
   receiving first endpoint information regarding a desired communications channel to be established between a first endpoint, a second endpoint and a third endpoint, wherein the first endpoint information includes at least a first public IP address for the first endpoint;

receiving second endpoint information wherein the second endpoint information includes at least a second public IP address for the second endpoint;

receiving third endpoint information wherein the third endpoint information includes at least a third public IP address for the third endpoint;

creating a cross-connection between the first, second and third public IP addresses; and providing a first cross-connection ID to the first endpoint wherein the first cross-connection ID includes a fourth public IP address not associated with the first, second or third endpoints.

13. The method according to claim 12, wherein the first, second and third endpoint information is received from an intermediate device attempting to establish the communications channel between the three endpoints.

14. The method according to claim 12, further comprising receiving a first set of one or more packets from the first endpoint at the fourth IP address and a port specified in the first cross-connection ID.

15. The method according to claim 14, further comprising receiving a second set of one or more packets from the second endpoint at a fifth IP address specified in a second cross-connection ID.

16. The method according to claim 15, further comprising receiving a third set of one or more packets from the third endpoint at a sixth IP address specified in a third cross-connection ID.

17. The method according to claim 16, further comprising:

mixing at least one of the packets from the first set of one or more packets and at least one of the packets from the second set of one or more packets to create a first mixed set of one or more packets;

mixing at least one of the packets from the first set of one or more packets and at least one of the packets from the third set of one or more packets to create a second mixed set of one or more packets; and mixing at least one of the packets from the second set of one or more packets and at least one of the packets from the third set of one or more packets to create a third mixed set of one or more packets.

18. The method according to claim 17, further comprising:

outputting the first mixed set of one or more packets to a first port associated with the third endpoint;

outputting the second mixed set of one or more packets to a second port associated with the second endpoint; and outputting the third mixed set of one or more packets to a third port associated with the first endpoint.

19. The method according to claim 18, further comprising:

forwarding the first mixed set of one or more packets to the third endpoint;

forwarding the second mixed set of one or more packets to the second endpoint; and forwarding the third mixed set of one or more packets to the first endpoint.

20. The method according to claim 12, wherein the first cross-connection ID includes a port ID.

21. The method according to claim 12, further comprising:

providing a second cross-connection ID to the second endpoint wherein the second cross-connection ID includes a fifth public IP address not associated with the first, second or third endpoints.

22. The method according to claim 12, further comprising:

providing a third cross-connection ID to the third endpoint wherein the third cross-connection ID includes a sixth public IP address not associated with the first, second or third endpoints.

* * * * *